US008336177B2

(12) United States Patent
Vernasca et al.

(10) Patent No.: US 8,336,177 B2

(45) Date of Patent: Dec. 25, 2012

(54) TOOL FOR THE CONNECTION OF TUBES BY MEANS OF CONNECTION SLEEVES

(75) Inventors: Ivaldo Vernasca, Parma (IT); Carlo Vernasca, Parma (IT); Francesco Vernasca, Parma (IT)

(73) Assignee: Autocondizionatori Zani S.R.L., Gambara (Brescia) (IT)

( * ) Notice: Subject to any disclaimer, the term of this patent is extended or adjusted under 35 U.S.C. 154(b) by 1380 days.

(21) Appl. No.: 11/995,922

(22) PCT Filed: Jun. 2, 2006

(86) PCT No.: PCT/IB2006/001625

§ 371 (c)(1), (2), (4) Date: Jan. 16, 2008

(87) PCT Pub. No.: WO2007/010339

PCT Pub. Date: Jan. 25, 2007

(65) Prior Publication Data

US 2010/0107393 A1 May 6, 2010

(30) Foreign Application Priority Data

Jul. 19, 2005 (IT) .............................. RE2005A0087
Sep. 27, 2005 (IT) .............................. RE2005A0106

(51) Int. Cl.

| | |
|---|---|
| ***B23P 19/02*** | (2006.01) |
| ***B23P 19/04*** | (2006.01) |
| ***B21D 39/04*** | (2006.01) |
| ***B21D 41/00*** | (2006.01) |
| ***B21J 7/16*** | (2006.01) |
| *B25B 27/14* | (2006.01) |

(52) U.S. Cl. ................ 29/237; 29/235; 29/282; 29/238; 72/402

(58) Field of Classification Search .................... 29/237, 29/236, 282, 272, 238; 72/402, 292
See application file for complete search history.

(56) References Cited

U.S. PATENT DOCUMENTS

| | | | | |
|---|---|---|---|---|
| 1,890,016 | A * | 12/1932 | Smith et al. | 72/402 |
| 3,049,951 | A | 8/1962 | Rensink | |
| 3,154,981 | A | 11/1964 | McDurmont | |
| 3,662,450 | A * | 5/1972 | Kish et al. | 29/237 |
| 3,805,580 | A * | 4/1974 | Leiker | 72/402 |
| 4,070,894 | A * | 1/1978 | Smith | 72/292 |

(Continued)

FOREIGN PATENT DOCUMENTS

DE 19649932 6/1998

(Continued)

*Primary Examiner* — Lee D Wilson
*Assistant Examiner* — Alvin Grant
(74) *Attorney, Agent, or Firm* — Browdy and Neimark, P.L.L.C.

(57) ABSTRACT

A tool for the connection of tubes (T) by means of connection sleeves (C), comprising two jaws (2, 3) which are mutually movable between an open rest position, and a closed work position wherein they define an annular reception seat (7) of the connection sleeve (C), and wherein they turn a circumferential series of radial punches (6) towards the sleeve (C); said jaws (2, 3) each comprising at least one punch (6) sliding towards the center of said reception seat (7), and being mutually connected by means of a kinematic system which permits them, when they are found in said open rest position, to confer a generally open-ring shape to said reception seat (7), through whose lateral opening (8) the connection sleeve (C) can be inserted and extracted by lateral movement.

9 Claims, 12 Drawing Sheets

U.S. PATENT DOCUMENTS 4,434,645 A * 3/1984 Svercl et al. .................... 72/402
4,578,982 A * 4/1986 Schrock .......................... 72/402
5,353,623 A * 10/1994 Bobenhausen ................. 72/402
5,666,711 A * 9/1997 Pfeiffer ........................... 29/272
5,715,723 A 2/1998 Owens
5,722,702 A * 3/1998 Washburn ..................... 285/340
5,899,107 A * 5/1999 Geimer et al. .................. 72/402
6,044,681 A * 4/2000 Frenken .......................... 72/292
6,044,686 A * 4/2000 Dischler ......................... 72/402
6,324,884 B1 * 12/2001 Barjesteh et al. ............... 72/402
6,415,488 B1 * 7/2002 Muto .............................. 29/237
6,457,338 B1 * 10/2002 Frenken ......................... 72/20.1
6,484,552 B1 * 11/2002 Bernas et al. ................... 72/402
6,772,618 B2 * 8/2004 Frenken ..................... 72/409.16
6,783,394 B1 * 8/2004 Holliday ....................... 439/578
6,857,305 B2 * 2/2005 Essen .............................. 72/402
6,880,864 B2 * 4/2005 Muto ............................ 285/322
7,788,779 B2 * 9/2010 Frenken .......................... 29/237
8,020,424 B2 * 9/2011 Suzuki et al. ................... 72/402
2006/0017282 A1 * 1/2006 Claus et al. ................... 285/179
2008/0276683 A1 * 11/2008 Frenken .......................... 72/402

FOREIGN PATENT DOCUMENTS

EP 0451417 A2 10/1991
EP 0908657 A1 4/1999
EP 1537933 A1 6/2005
FR 1173617 A1 2/1959
WO WO0247840 A2 6/2002

* cited by examiner

TOOL FOR THE CONNECTION OF TUBES BY MEANS OF CONNECTION SLEEVES

TECHNICAL FIELD

The present invention refers to a tool for the connection of tubes by means of connection sleeves in plastically deformable, typically metallic material.

More in particular, the present invention refers to a tool for the connection of tubes for fluids under pressure, intended for example for making the conveying ducts of the refrigerating fluid in the conditioning systems of motor vehicles.

BACKGROUND ART

As is known, said conveying ducts are generally situated inside the engine compartment of the motor vehicles, where they extend in a winding progression so to not interfere with the other devices contained therein.

For this reason, the conveying ducts are generally composed of a succession of substantially rectilinear rubber tubes, which are connected with each other, watertight, by means of appropriate connection elements made of typically metallic, plastically deformable material which can be bent to make the elbows of the duct.

Said connection elements generally comprise an intermediate tube and two lateral connection sleeves, which are inserted on the end section of a respective rubber tube, and are subsequently plastically deformed so to be fixed to the same tube.

In the manufacturing of the conveying ducts, such plastic deformation is normally achieved by means of fixed operating machines which comprise a substantially annular support structure which bears a set of radial punches arranged around its central axis.

The conveying duct is made to axially slide inside said support structure, so to position each time the connection sleeves in an operating position, wherein they are surrounded by said radial punches.

Therefore, said punches are simultaneously operated and pressed on the connection sleeve, so to make overall a series of circumferential crimps on the sleeve which are pressed against the rubber tube, which firmly fix it to the latter.

In particular, to ensure the watertight seal of said fixing, the use of operating machines having at least eight radial punches has been shown to be necessary.

In the repairing of conveying ducts, such fixed operating machines cannot be effectively used since they do not permit operating directly on the conveying duct without removing it from the system.

Therefore, in this field, portable tools are normally used of small size, which can be easily manipulated by a user and are less costly.

Said portable tools are of clamp type, and comprise two jaws which are generally lunette-shaped and have facing concavities, which are mutually movable along a rectilinear direction, with mutual approaching and moving away motion between an open rest position and a closed work position.

Every single jaw bears a set of punches arranged radially with respect to the axis of the respective lunette, such that during the mutual approaching movement between the jaws—generally driven by a jack—said punches are pressed on the connection sleeve, realising the abovementioned circumferential crimps.

Said jaws are mutually connected by means of two lateral guide stems which define, with the same jaws, an encircling structure which surrounds the connection sleeve even when the tool is in rest position.

For this reason, the connection sleeve must necessarily be axially inserted inside said encircling structure; this requires that the conveying duct is removed beforehand from the related system, considerably increasing the work times and the operating difficulties.

Moreover, since the jaws are moved in a rectilinear direction, the punches are pressed on the connection sleeve with a deforming force whose radial component depends on the tilt of every single punch with respect to the aforesaid direction.

This fact, in addition to leading to the realisation of imperfect circumferential crimps, also limits the maximum number of punches which can be mounted on the tool, beyond which the more tilted punches would result totally ineffective.

For the known tools, such maximum limit is six punches, and is therefore generally insufficient for ensuring the watertight seal of the connection which is made between the connection sleeve and the rubber tube inserted in it.

The present invention moreover regards a device for the actuation of work tools of portable type, i.e. which can be easily handled and transported by the user during their use.

More in particular, the invention regards a device intended to be associated with any one portable work tool which can be operated by means of a hydraulic jack.

As is known, the portable work tools commonly comprise movable operating members, which are connected by means of an appropriate kinematic system which permits them to be mutually moved, so to carry out the operation for which the related tool is assigned.

One such example is provided by the already mentioned clinching tools which are normally employed for realising a connection between two flexible tubes.

In fact, said clinching tools generally comprise a plurality of punches adapted to be arranged around a connection boss placed at the end of said tubes, and a kinematic system adapted to press said punches on the connection boss itself, to deform it and firmly fix it to the tubes.

The kinematic system which connects the operating members of the known clinching tools is normally operated by a hydraulic jack, whose operating fluid, typically oil, is contained within a small tank which is firmly associated with the body of the jack itself; the oil is pushed in the compression chamber between the cylinder and piston by a manual volumetric pump.

Said volumetric pump commonly comprises a plunger sliding with alternating motion inside a cavity made in the jack body, so to define a work chamber communicating with the suction with the tank and with the delivery with the compression chamber.

Normally the plunger projects outside the jack body, and is mechanically coupled with a manual driving lever which permits an operator to movably engage it.

To transmit the operating members the correct force which permits the work tool to effectively realise the operation for which it is assigned, it is not unusual that even very high pressure values must be reached in the compression chamber of the hydraulic jack.

For this reason, it is necessary that the operator subjects the plunger to numerous back and forth strokes, with an increasingly elevated stress as the pressure in the compression chamber increases.

Therefore, one particularly noted drawback of the known work tools lies in the fact that their use is generally very slow and tiring for the operator.

DISCLOSURE OF INVENTION

A first object of the present invention is that of making available a clinching tool which permits overcoming the mentioned drawbacks of the known clinching tools.

A second object of the present invention is that of making available a device for the actuation of work tools, for example clinching tools, which permits overcoming the mentioned drawbacks of the currently employed tools.

Further object of the invention is that of achieving said objectives in the context of simple, rational solutions with limited costs.

The first object is achieved by the invention by means of a tool for the connection of tubes by means of connection sleeves, comprising two jaws which are mutually movable between an open rest position, and a closed work position wherein they define an annular reception seat of the connection sleeve, and wherein they turn a circumferential series of radial punches towards the sleeve.

According to a first aspect of the invention, said jaws each comprise at least one punch sliding towards the centre of said reception seat, and are mutually connected by means of a kinematic system which permits them, when they are found in said open rest position, to confer a generally open-ring shape to the reception seat, through whose lateral opening the connection sleeve can be inserted and extracted by lateral movement.

In this manner, it is advantageously possible to operate on the conveying duct without completely removing it from the system, since it is no longer necessary to insert the tool in the axial direction on the conveying duct itself, so to place the connection sleeve between the jaws, as it is instead required by the prior art.

According to a further aspect of the invention, said circumferential series of radial punches is composed of two distinct sequences of punches, where every single sequence is associated with a respect jaw, and where every single punch of each sequence is associated with an actuation group which causes its back and forth radial movements when the jaws are in the closed work position.

Due to this solution, each punch is pressed on the connection sleeve substantially with the same radial force. Therefore, it is possible to both make optimal circumferential crimps and equip the tool with an overall number of punches sufficient to ensure the watertight seal of the connection between the connection sleeve and the rubber tube, i.e. at least equal to eight punches.

The second object is achieved by the invention by means of a device for the actuation of work tools of the type outlined in the introduction, i.e. comprising a hydraulic jack to which a volumetric pump is firmly associated which is adapted to push an operating fluid under pressure inside the hydraulic jack itself.

According to the invention, said device comprises a kinematic group for the actuation of the volumetric pump, which is firmly associated with the hydraulic jack and is mechanically connectable to a separate motorisation device.

Due to this solution, the manual intervention of the operator is therefore no longer necessary for pumping the operating fluid into the hydraulic jack, reducing the operating times and facilitating the execution of the clinching operation.

BRIEF DESCRIPTION OF DRAWINGS

Further characteristics and advantages of the invention will be evident from the reading of the following description, provided as a non-limiting example, with the aid of the figures illustrated in the attached tables, wherein.

BEST MODE FOR CARRYING OUT THE INVENTION

Figure 7:
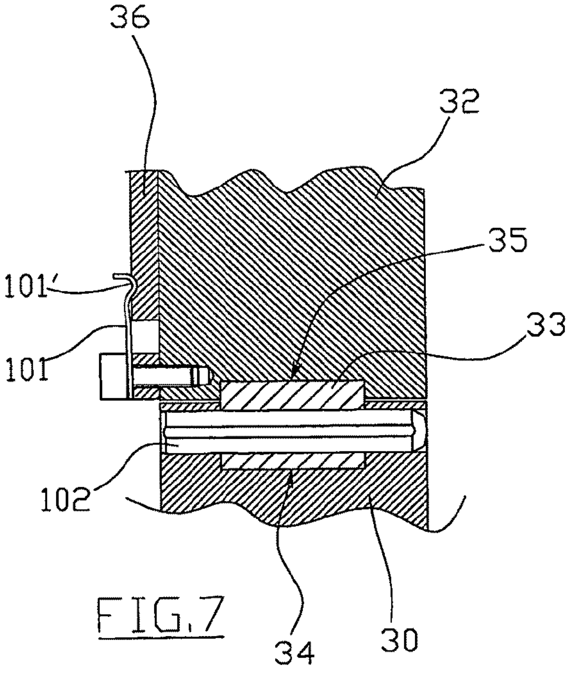
FIG. 7 is the trace section VII-VII indicated in FIG. 2.
Figure 8:
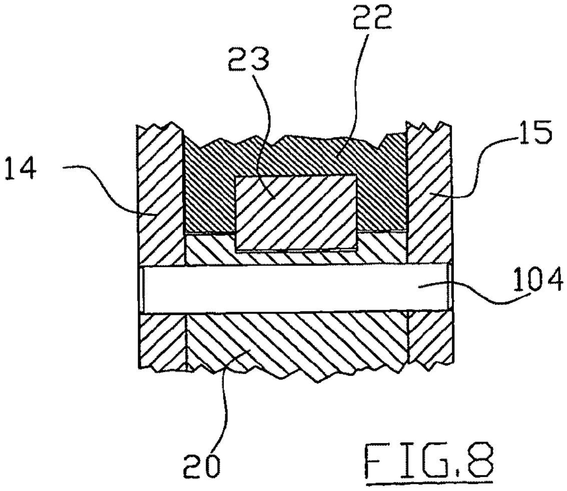
FIG. 8 is the trace section VIII-VIII indicated in FIG. 2.
Figures 9, 10:
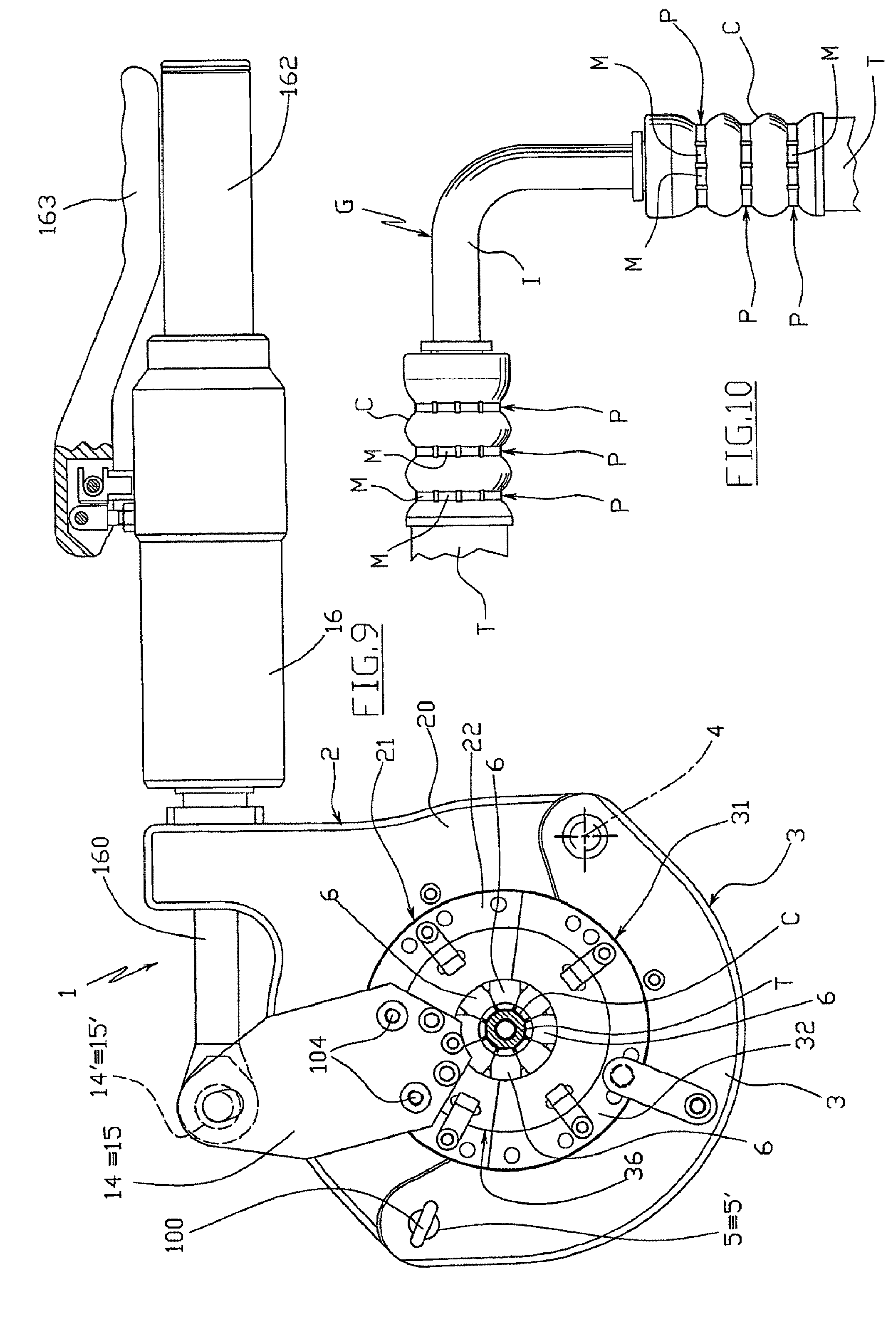
FIG. 9 shows the tool of FIG. 1 during the realisation of the circumferential crimps on the connection sleeve.
FIG. 10 shows a normal connection element for tubes, which is fixed to them by means of the tool of FIG. 1.

FIGS. 1-9 illustrate a portable clinching tool 1 which serves to connect rubber tubes T, typically for fluids under pressure, by means of appropriate connection elements G, of the type of that shown in FIG. 10, i.e. comprising an intermediate tube I and two generally metallic connection sleeves C, within which the ends of the rubber tubes T to be connected are inserted.

In particular, the tool 1 is adapted to plastically deform each connection sleeve C to make a series of circumferential crimps P on it, which, pressed against the respective rubber tube T, fix the sleeve to the tube.

Figure 1:
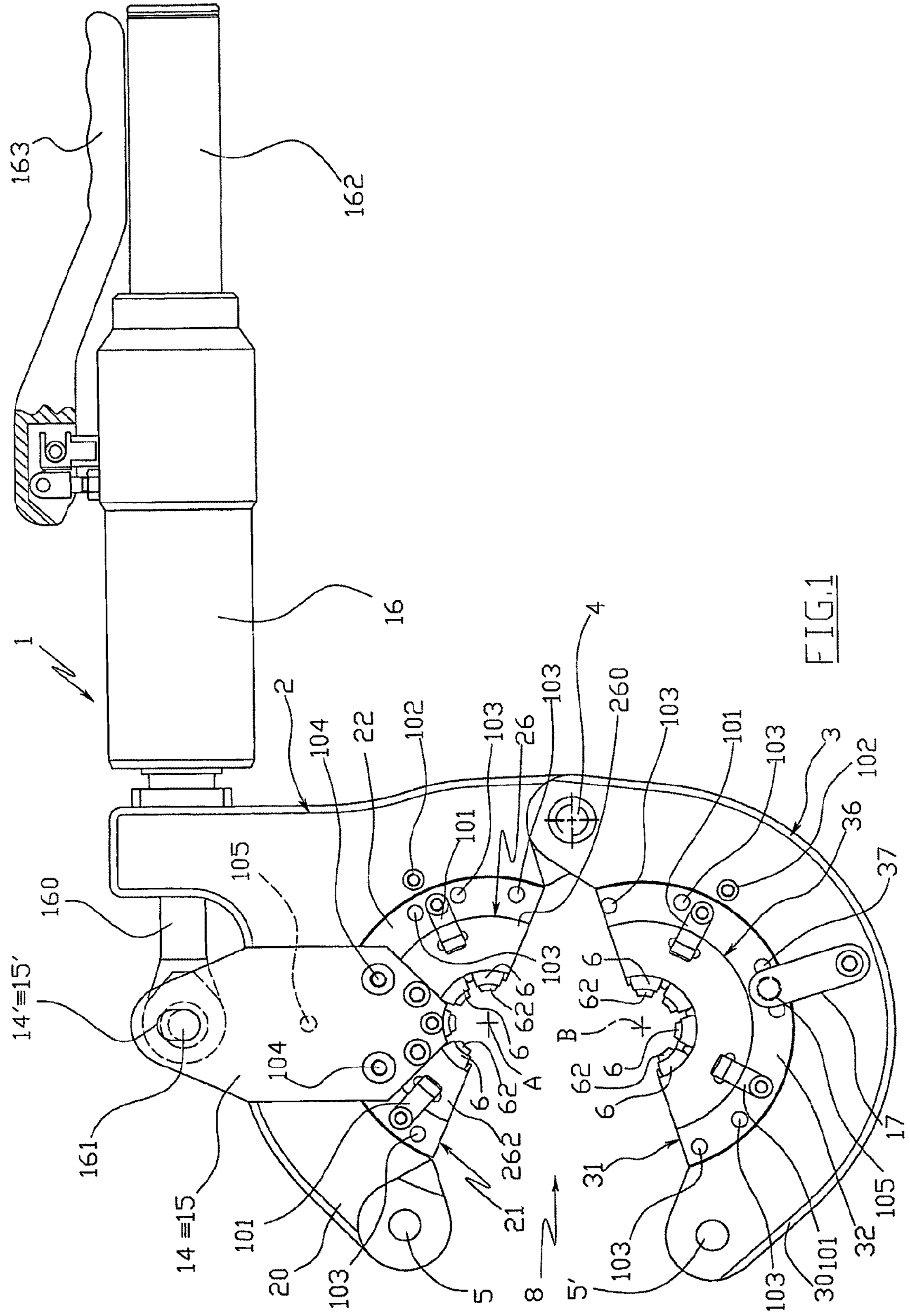
FIG. 1 shows a clinching tool in accordance with the invention, with the jaws in open rest position.
Figure 2:
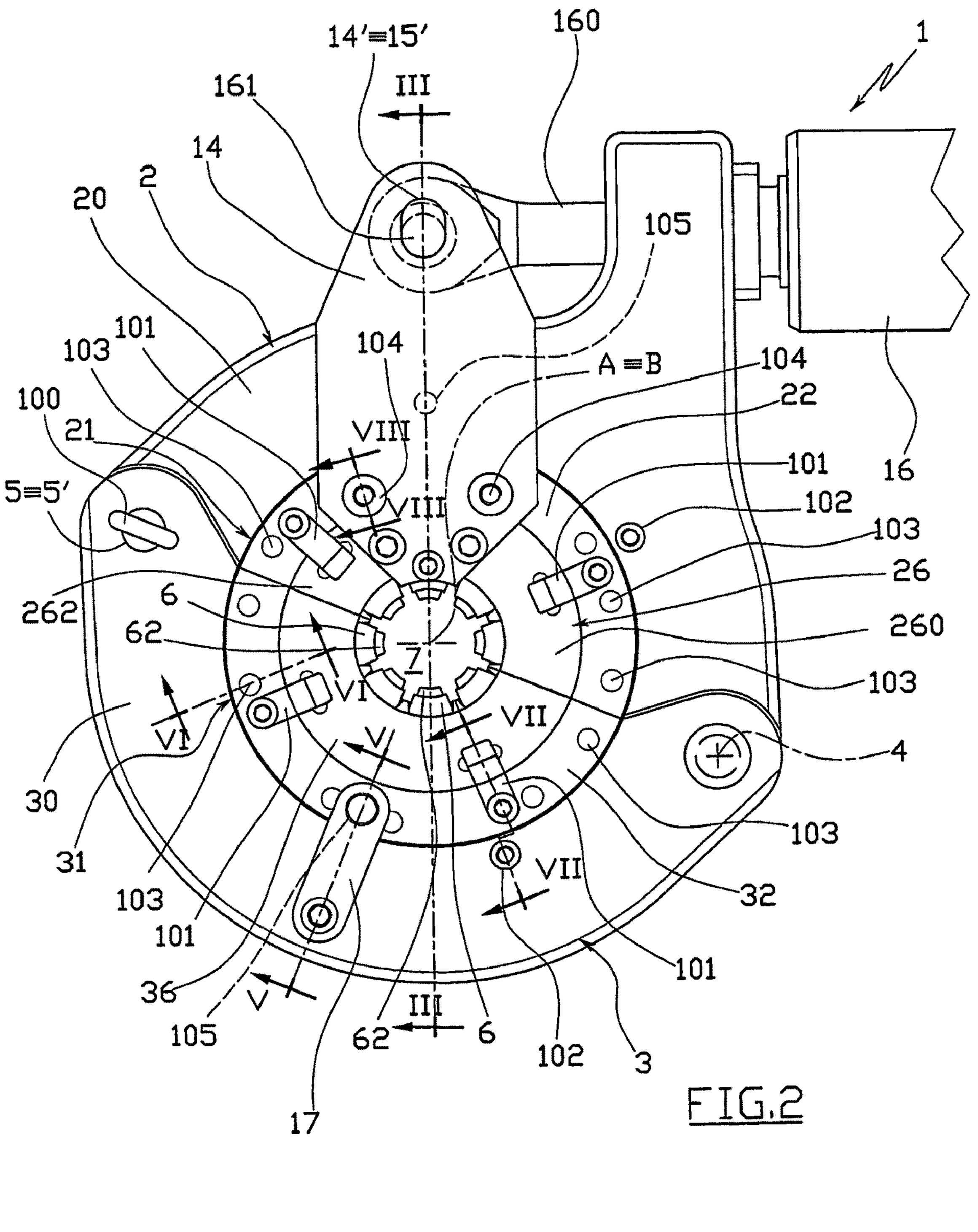
FIG. 2 is an enlarged detail of the tool of FIG. 1, with the jaws in closed work position.

As shown in FIGS. 1 and 2, the tool 1 comprises a fixed jaw 2 and a movable jaw 3, which are mutually connected by means of a kinematic system which permits them to be mutually moved between an open rest position and a closed work position.

Each of said jaws, 2 and 3, comprise a lunette-shaped outer body, 20 and 30, whose concavity houses an activated inner band 21 and 31, substantially shaped as a circular half-crown, which bears a set of angularly equidistant radial punches 6 arranged around their curvature axis, A and B.

In particular, the outer bodies 20 and 30 have two respective ends which are mutually connected by means of a hinged joint 4 which permits the jaws 2 and 3 to rotate with respect to each other, along a rotation axis orthogonal to the common position plane.

Moreover, at the opposite ends, said outer bodies 20 and 30 are provided with locking means adapted to constrain the jaws 2 and 3 in the closed work position; said locking means comprise two respective through openings 5 and 5' adapted to be coaxially arranged so to receive a bolt 100 in engagement.

When the jaws 2 and 3 are found in said closed work position, they define an encircling annular reception seat 7 of the connection sleeve C, and arrange the radial punches 6 radially around it (see FIG. 2).

When however the jaws 2 and 3 are in the open rest position, they are separate from each other and confer said reception seat 7 a generally open-ring shape, through whose lateral opening 8 it is possible to insert and extract the connection sleeve C by lateral movement (see FIG. 1).

Figure 4:
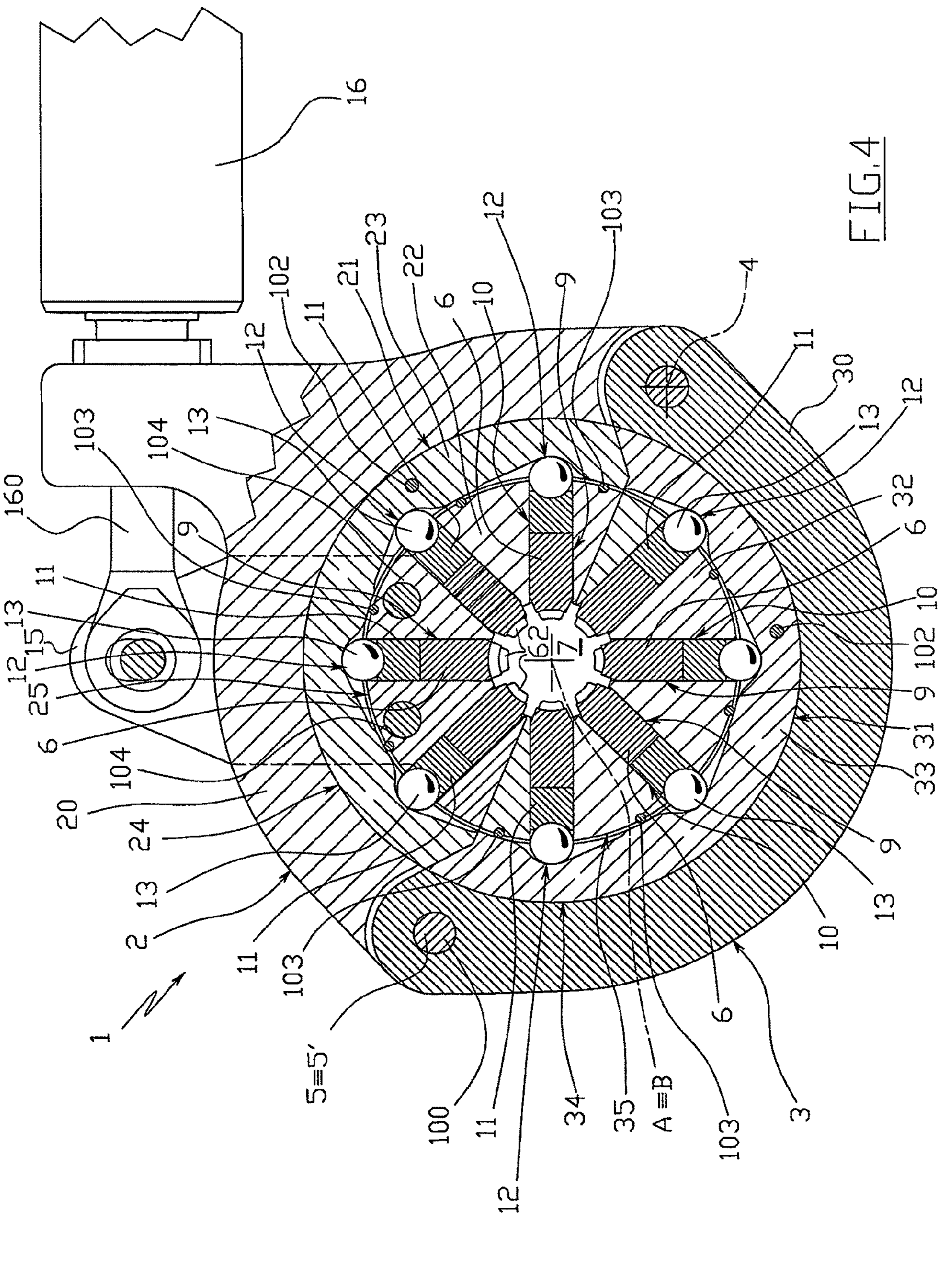
FIG. 4 is the trace section IV-IV indicated in FIG. 3.
Figure 5:
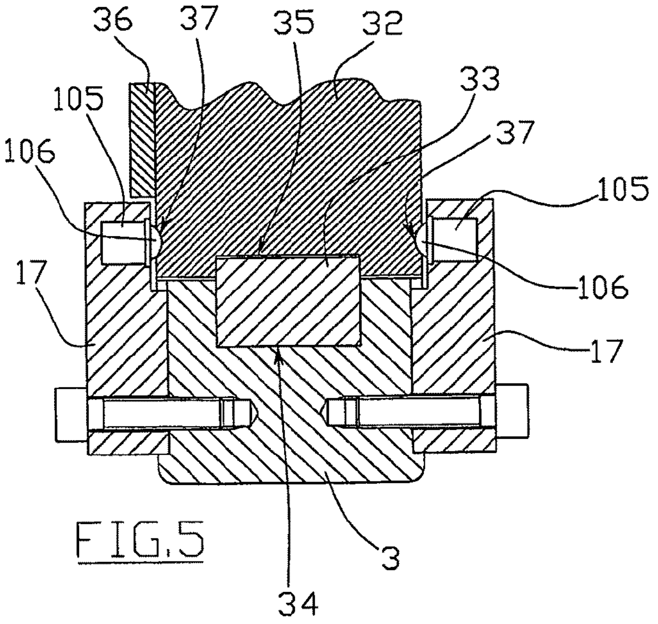
FIG. 5 is the trace section V-V indicated in FIG. 2.

As shown in FIG. 4, every single activated inner band 21 and 31 comprises two respective concentric half-rings, including an inner support half-ring 22 and 32 and an outer driving half-ring 23 and 33.

In particular, each driving half-ring 23 and 33 is partially received inside an entirely curved groove 24 and 34 made in the concave surface of the corresponding outer body 20 and 30, and is firmly fixed to the latter by means of a respective transverse elastic/cylindrical pin 102 (see FIG. 7).

Figure 3:
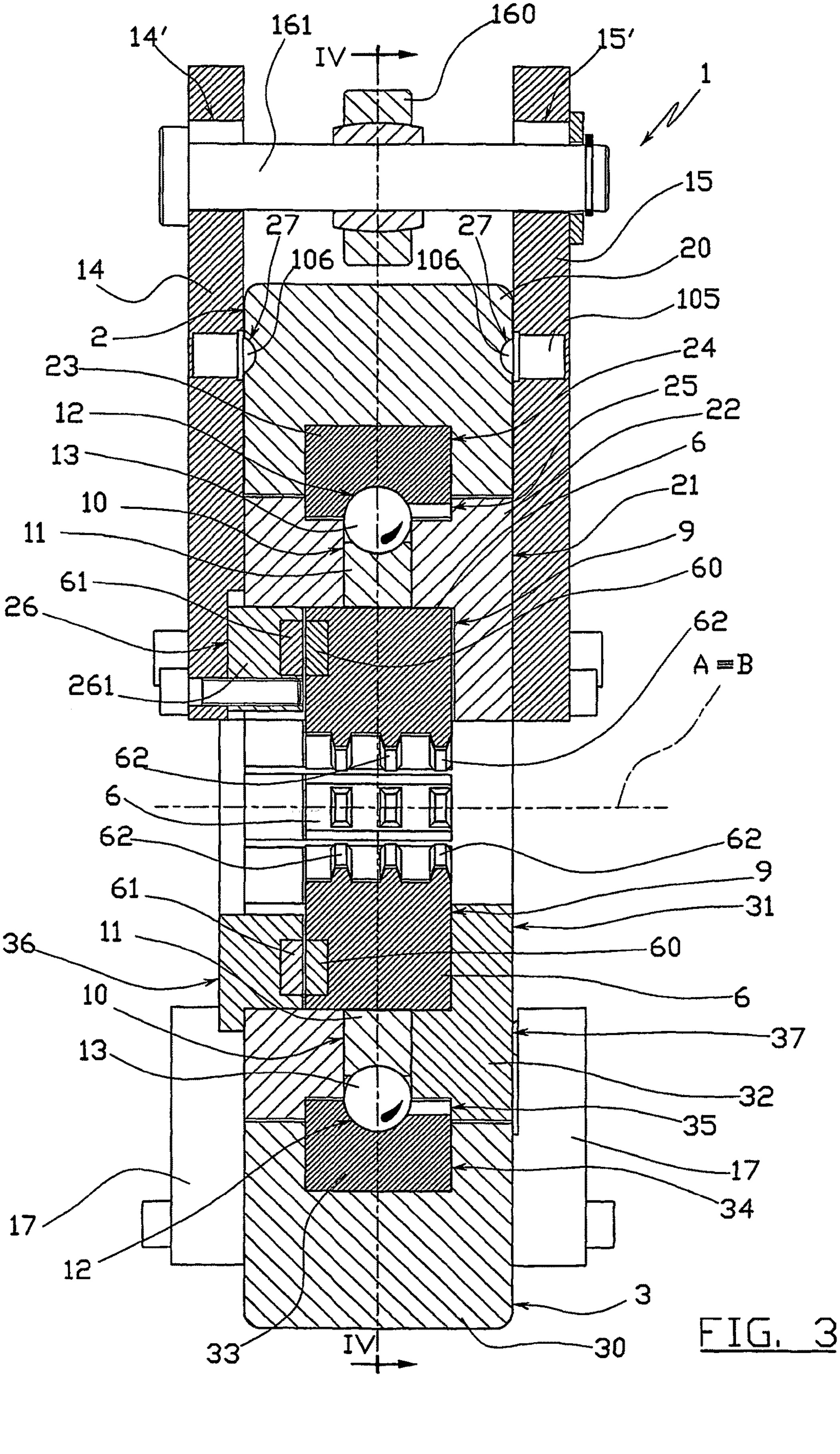
FIG. 3 is the trace section indicated in FIG. 2.

Moreover, each driving half-ring 23 and 33 projects from said curved groove 24 and 34 with a projecting section which is in turn received in an entirely curved slot 25 and 35 made in the outer surface of the corresponding support half-ring 22 and 32, so to realise a prismatic coupling which permits the support half-rings 22 and 32 to oscillate around their curvature axis, A and B (see FIG. 3).

Figure 6:
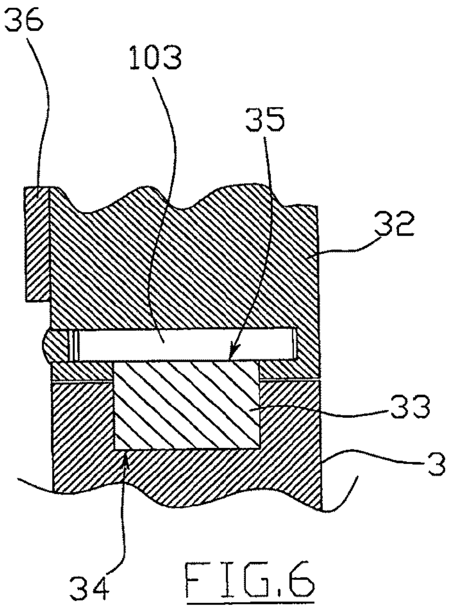
FIG. 6 is the trace section VI-VI indicated in FIG. 2.

In particular, to improve and make more fluid said oscillation, each of the aforesaid curved slots 25 and 35 is provided on the bottom with a series of transverse rollers 103 integral with it, which are adapted to roll in contact with the inner surface of the corresponding driving half-rings 23 and 33 (see FIG. 6).

Such transverse rollers 103 may nevertheless not be necessary if the surfaces in contact with the driving half-rings 23, 33 and support half-rings 22, 32 are subjected to appropriate surface working and/or treatments directed towards improving the mutual sliding.

Each support half-ring 22 and 32 is adapted to act as a seat for the radial punches 6, and comprises a series of identical, angularly equidistant prismatic engagement recesses 9 which extend radially and are adapted to slidably house a respective radial punch 6.

A closure plate in the form of a circular half-crown 26 and 36 is fixed to each support half-ring 22 and 32, which is adapted to close said engagement recesses 9 to hold the radial punches 6 inside them, and which can be removed to permit a quick and easy substitution of the punches 6 (see FIGS. 1, 2, and 3).

Concerning the closure plate 36, this is composed of a single body which is fixed to the corresponding support half-ring 32 by means of two locking brackets 101. Said locking brackets 101 are fixed on the side of the support half-ring 32 and extend inward, so to surmount the closure plate 36 with a curved section 101' which is engaged in a corresponding impression, made in the closure plate 36 itself (see FIG. 7).

Concerning the closure plate 26, on the other hand, this is composed of a composite body, which is formed by three distinct portions, respectively 260, 261 and 262, shaped as circular sections and mutually fit with each other. The lateral portions 260 and 262 are fixed to the corresponding support half-ring 32 by means of a respective locking bracket 101, entirely analogous to that previously described (see FIGS. 1 and 2); while the intermediate portion 261 is screwed by the inner part of an advancing bracket 14, which will be described in greater detail below (see FIG. 3).

As illustrated in FIG. 4, every single engagement recess 9 of each support half-ring 22 and 32 opens to the outer surface of the same by means of a housing hole 10 for a thrust section 11.

Correspondingly, the inner surface of each driving half-ring 23 and 33 bears, at each single thrust section 11, a shaped profile 12, against which a rolling element 13 abuts—in the example this element 13 is a sphere—and facing said thrust section 11; said rolling element 13 being received in a rolling race made in the inner surface of the corresponding driving half-ring, 23 and 33 (see FIG. 3).

In particular, every rolling element 13 is constantly maintained in contact with the shaped profile 12 by means of a check system comprising a first permanent magnet 60 fixed on a side of the corresponding punch 6, and a second permanent magnet 61, opposite said first magnet 60 and fixed to the closure plate 26 and 36, which faces it (see FIG. 3).

In this manner, if the punch 6 slides inward within the engagement recess 9, said permanent magnets 60 and 61 exert on it a magnetic attraction force with a radial component directed outward, which pushes the radial punch 6 against the thrust section 11, which in turn pushes the rolling element 13 against the shaped profile 12. Due to this solution, following an oscillation of the support half-rings 22 and 32 along their curvature axes A and B, every rolling element 13 is constrained to follow the respective shaped profile 12, which acts as a cam and drives the thrust section 11 to engage the punch 6 in radial sliding.

Concerning the actuation, this is assigned to two opposite, advancing brackets 14 and 15 which are fixed on opposite sides of the support half-ring 22 by means of a pair of transverse elastic/cylindrical pins 104 (see FIG. 8).

Said advancing brackets 14 and 15 are driven by a jack 16, firmly fixed to the outer body 20 of the fixed jaw 2, which comprises a sliding stem 160 adapted to be moved with alternating motion along a rectilinear direction orthogonal to the curvature axis A of the support half-ring 22.

In particular, the free end of said sliding stem 160 bears a transverse pin 161, which is inserted in two mutually facing openings 14' and 15' which are respectively made in the advancing brackets 14 and 15.

In this manner, since the oscillation which must be impressed on the support half-ring 22 to drive the radial punches 6 is relatively little (on the order of 8-15 degrees), such openings 14' and 15' are sufficient to make the rotary movement of the advancing brackets 14 and 15, and the rectilinear movement of the sliding stem 160 of the jack 16, compatible with each other.

As can be understood, the aforesaid actuation can only occur with the jaws 2 and 3 in the closed work position, i.e. when the support half-rings 22 and 32 are in mutual contact, so that the movement imposed on the support half-ring 22 is also transmitted to the support half-ring 32.

When instead the jaws 2 and 3 are in rest position, the support half-rings 22 and 32 are mutually spaced and can freely rotate around their own curvature axes A and B, independent from each other.

To avoid that the support half-rings 22 and 32 can be moved in this position with respect to the corresponding outer bodies 20 and 30, and possible be unthreaded from their seat, the invention foresees constraining means.

In particular, the support half-ring 22 is constrained by the outer body 20 of the fixed jaw 2 by means of two elastic stops 105, each borne by a respective advancing bracket 14 and 15; said elastic stops 105 being each composed of a sphere 106 which is pushed by a spring (not shown) on the respective side of the outer body 20, and which is adapted to be engaged in an impression 27 made on the outer body 20 (see FIG. 3).

Similarly, the support half-ring 32 is constrained by the outer body 30 of the jaw 3 by means of two elastic stops 105 of the same type of those described above, which are borne by two drive brackets 17 fixed on opposite sides of the outer body 30, and whose spheres 106 are adapted to be engaged in corresponding impressions 37 made on the sides of the support half-ring 32 (see also FIG. 1).

The portable tool 1 is finally completed by a handgrip 162, associated with the jack 16, which is adapted to permit its handling by an operator, and by a driving lever 163 of the jack 16 itself, placed at said handgrip 162.

Due to the structure of the above described tool 1, when in use and the jaws 2 and 3 are in the closed work position and encircle the connection sleeve C, the oscillation of the support half-rings 22 and 32 occurs simultaneously and, consequently, the radial punches 6 are engaged to simultaneously and radially slide towards the centre of the reception seat 7 (see FIG. 9).

In this mode, said radial punches 6 are simultaneously pressed against the outer surface of said connection sleeve C, so to make on the sleeve C the desired circumferential crimps P.

In particular, each radial punch 6 bears at least one tooth 62 which projects from its face turned towards the centre of the reception seat 7 and which is adapted to impress on the connection sleeve C a corresponding impression M (see FIG. 10).

In this manner, the impressions M made by all radial punches 6 during a pressing operation result aligned along a perimeter circumference of the connection sleeve C and thus define a circumferential crimp P.

In the example shown in FIG. 3, each radial punch 6 bears three distinct, mutually spaced teeth 62 which are aligned in the axial direction, which permit making with a single pressing operation the same number of impressions M, and therefore the same number of circumferential crimps P.

Moreover, due to the fact that the punches 6 are engaged in a radial direction movement, each of these is pressed on the connection sleeve C with substantially the same force.

For this reason, the impressions M which they make are all substantially equal, and permit making an optimal circumferential crimp P.

Moreover, this permits overcoming the limitations related to the number of employable punches 6, which in this case can be equal to at least eight, so to ensure the watertight seal of the connection between the connection sleeve C and the rubber tube T inserted in its interior.

Figure 11:
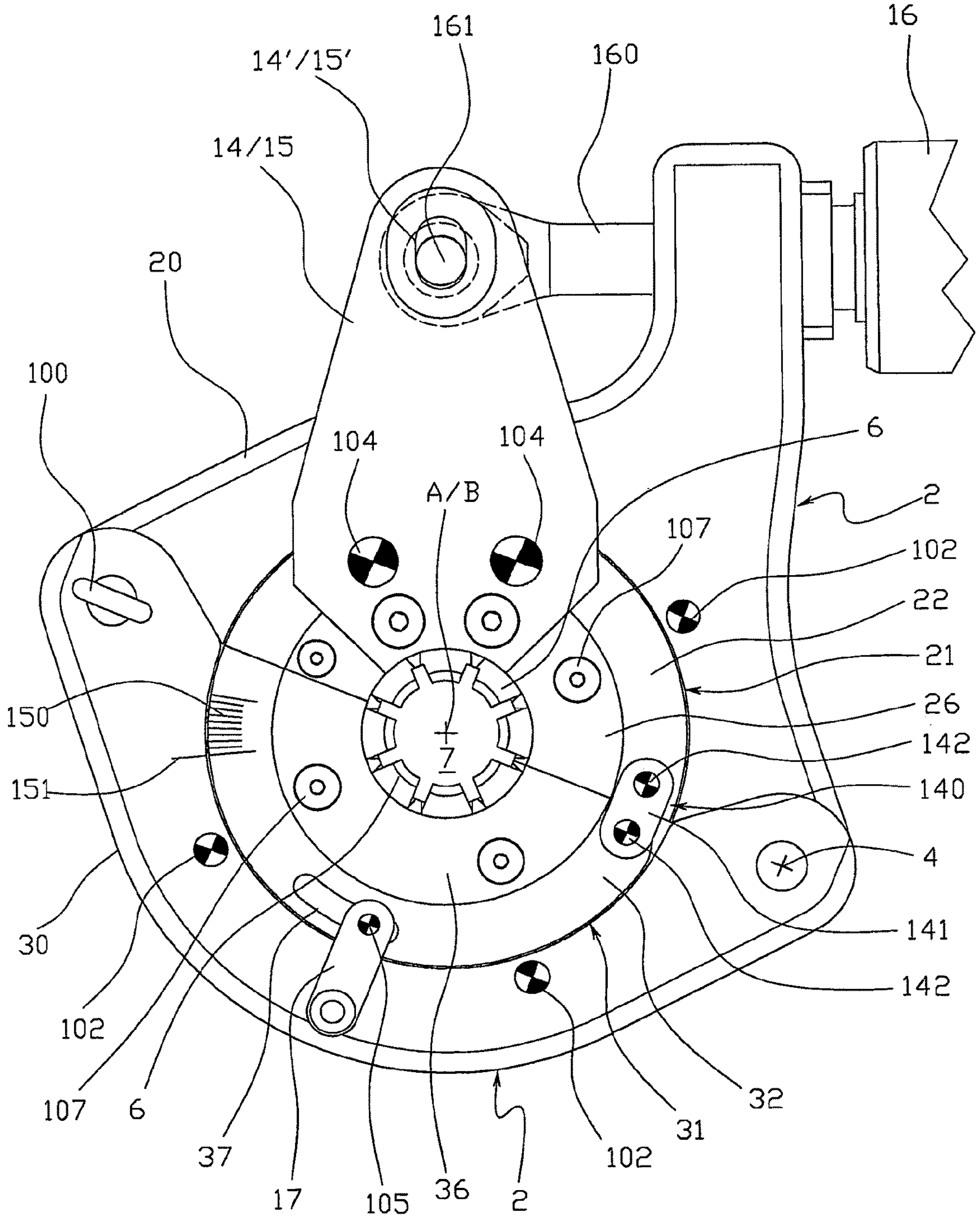
FIG. 11 shows an alternative embodiment of the tool according to the invention.
Figure 12:
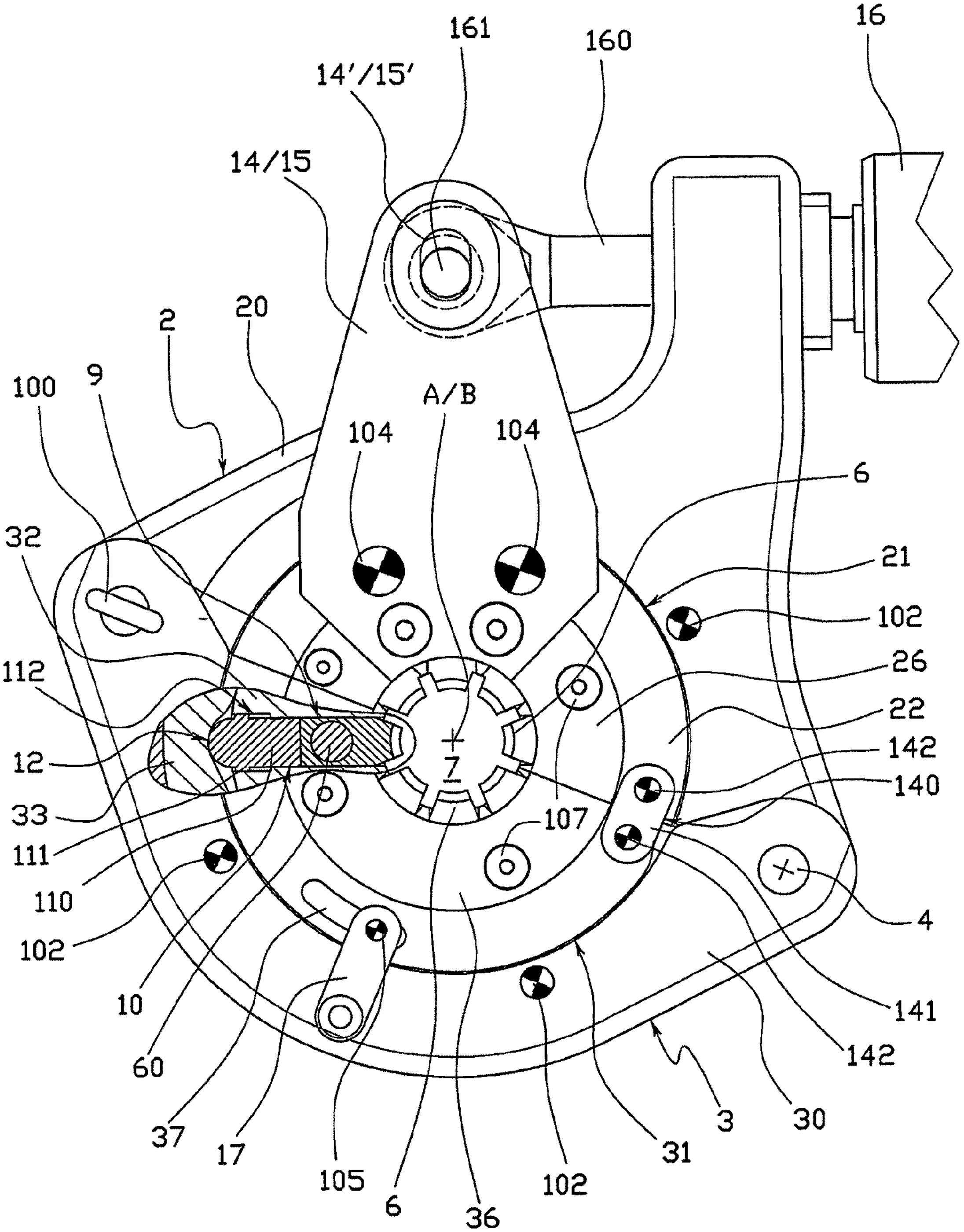
FIG. 12 is FIG. 11 partially sectioned along a longitudinal plane so to better illustrate some of its characteristics.

FIGS. 11 and 12 show an alternative and preferred embodiment of the clinching tool 1 described above.

Such alternative embodiment differs from the preceding one for the structural details which are discussed more at length below. Of course, the description of the elements in cannon between the two embodiments is omitted; these are indicated with the same reference numbers.

A first difference consists of the fact that the support half-rings 22, 32 are not free from each other, but are mutually connected by means of a hinged device 140, which is adapted to connect their ends placed in proximity to the joint 4 of the jaws 2 and 3.

In this mode, said hinged device 140 allows the support half-rings 22, 32 to rotate, separating from each other when the jaws 2, 3 are brought into open configuration, while it constrains them to stay perfectly in contact during the clinching step, when the jaws 2, 3 are in closed work position and they are engaged to rotate.

In the illustrated example, said hinged device 140 comprises at least one generally flat connector 141, whose opposite ends are each joined to the end of a respective support half-ring 22, 32; this occurs by means of a related pivot 142 which defines a rotation axis orthogonal to the position plane of the jaws 2 and 3.

Preferably, both pivots 142 cross through the entire thickness of the support half-rings 22, 32, so to be engaged with a further connector 141 (not shown) situated on the opposite side of the support half-rings 22, 32 themselves.

In this manner, the two connectors 141 and the two through pivots 142 define overall a hinged device 140 which is substantially shaped as a chain link.

As illustrated in FIG. 12, a further difference consists in the fact that only one thrust section 110 is interposed between each punch 6 and the related shaped profile 12.

Said thrust section 110 has a generally cylindrical shape, with a first flat end adapted to be in contact with the related punch 6, and a second end shaped as a half-sphere adapted to be in contact with the related shaped profile 12.

The thrust section 110 moreover comprises an annular section 111 of greater diameter, which is slidably and perfectly received in a corresponding enlarged section 112 of the respective housing hole 10; said enlarged section 112 being made in the terminal part of said housing hole 10 facing the related cam profile 12.

Due to this solution, the number of structural components of the clinching tool 1 is advantageously reduced with respect to the first embodiment; moreover, the thrust sections 110 are always constrained by the related support half-rings 22, 32, even when the punches 6 are extracted and disassembled from the tool 1.

A further difference regards the closure plates 26 and 36, which are adapted to laterally close the engagement recesses 9 of the support half-rings 22 and 32 to hold the punches 6 at their interior.

In this embodiment, in fact, said closure plates 26, 36 are not fixed by means of the described locking brackets 101, but through related fixing screws 107 which are engaged in corresponding threaded holes made in the support half-rings 22, 32.

With this solution, it is no longer foreseen that the closure plates 26, 36 must be removed to proceed to the substitution of the punches 6. On the contrary, it is foreseen that such substitution occurs by radially extracting the punches 6 from the related engagement recesses 9 when the jaws 2 and 3 are in closed position.

Such extraction is carried out with the aid of a small tool (not shown) which is equipped with a magnet adapted to be fixed on the projecting end of a punch 6, and a handgrip for the manual movement of said magnet.

In this manner, the punch 6 is radially extracted and brought inside the annular seat 7 of the tool 1, from which it is removed by moving it parallel to the direction of the curvature axes A and B.

In fact, a further difference consists of the fact that it foresees means adapted to indicate the rotation angle achieved by the support half-rings 22 and 32 with respect to the related outer bodies 20 and 30 during the clinching step of a connection sleeve C.

In the example of FIG. 11, said indicating means comprise a graduated angular scale 150 fixed to the support half-ring 32, and an indicator 151 fixed to the outer body 30.

In particular, said graduated scale 150 is composed of a series of marks made directly on the support half-ring 32, and said indicator 151 is composed of a single mark made on the outer body 30 and adapted to be always facing the graduated scale 150.

In this manner, it is possible to establish a zero point on the graduated scale 150, such that when the indicator 151 is aligned with the zero point, the relative angular position between the support half-rings 22, 32 and outer bodies 20, 30 requires that the punches 6 are found at the maximum distance from the centre of the seat 7.

Moreover, it is possible to establish a series of subsequent reference points which correspond to positions of the punches 6 as they approach the centre of the seat 7, so to check at every moment the depth of the impressions M which are produced on the sleeve C during the clinching.

FIGS. 13-16 show an actuation device 70 according to the present invention, which is applied to a portable clinching tool 1 in accordance with the first above described embodiment.

For greater clarity, the tool 1 is represented here in simplified form.

Of course, it is intended that the aforesaid actuation device 70 is not only associable with said tool 1, but can effectively be applied to any other type of work tool with fluid dynamic actuation.

Figure 13:
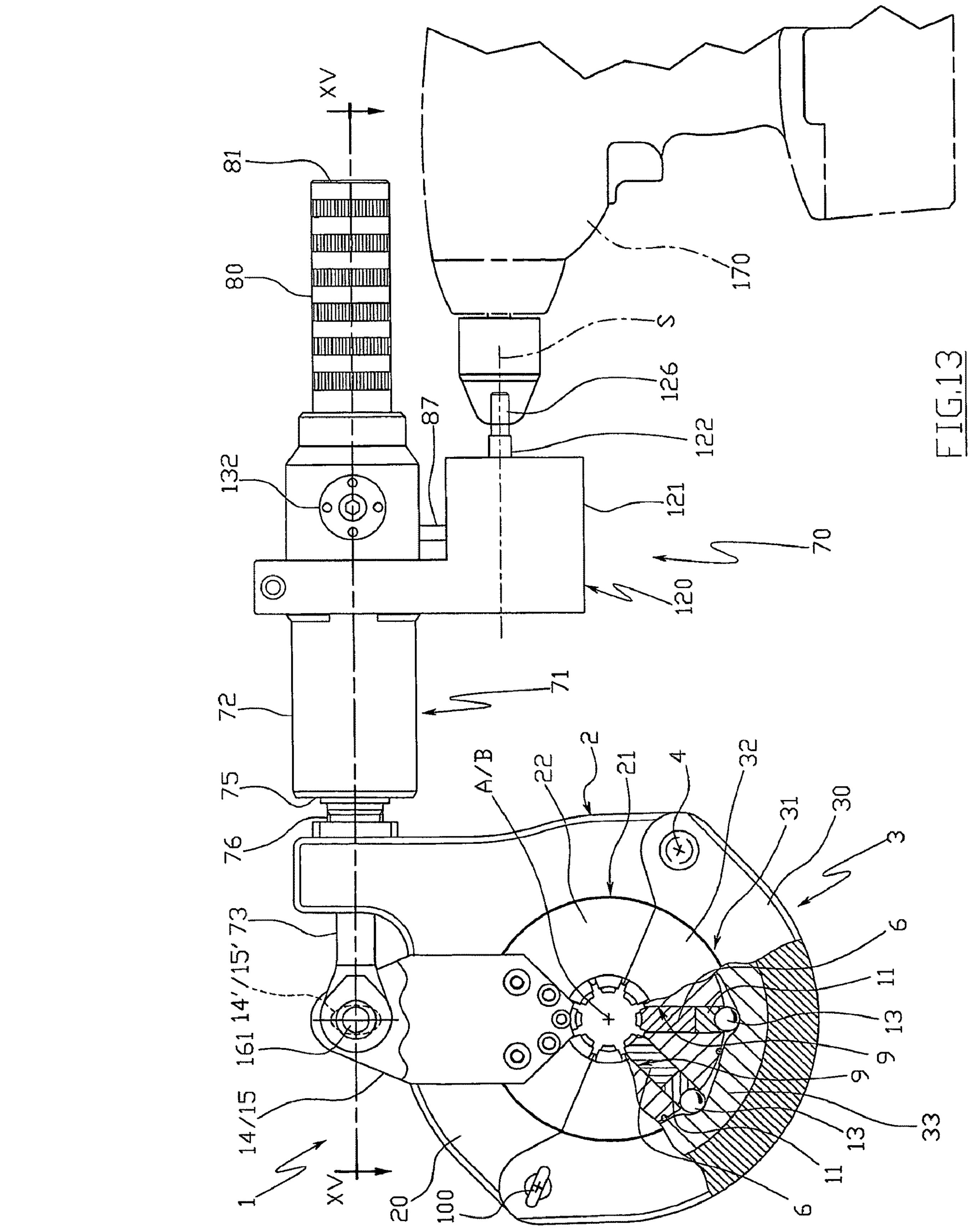
FIG. 13 shows an actuation device according to the invention, applied to the tool of FIG. 1.

As is illustrated in FIG. 13, the actuation device 70 comprises a hydraulic jack 71 composed of an outer body 72, firmly fixed to the outer body of the tool 1, and a movable plunger 73 adapted to engage in rotation the advancing brackets 14, 15.

In particular, the free end of the plunger 73 bears the transverse pivot 161, which is received in the facing openings 14', 15' which are made in said advancing brackets 14, 15, so to make the rotary movements of the latter compatible with the linear movement of the plunger 73.

Figure 14:
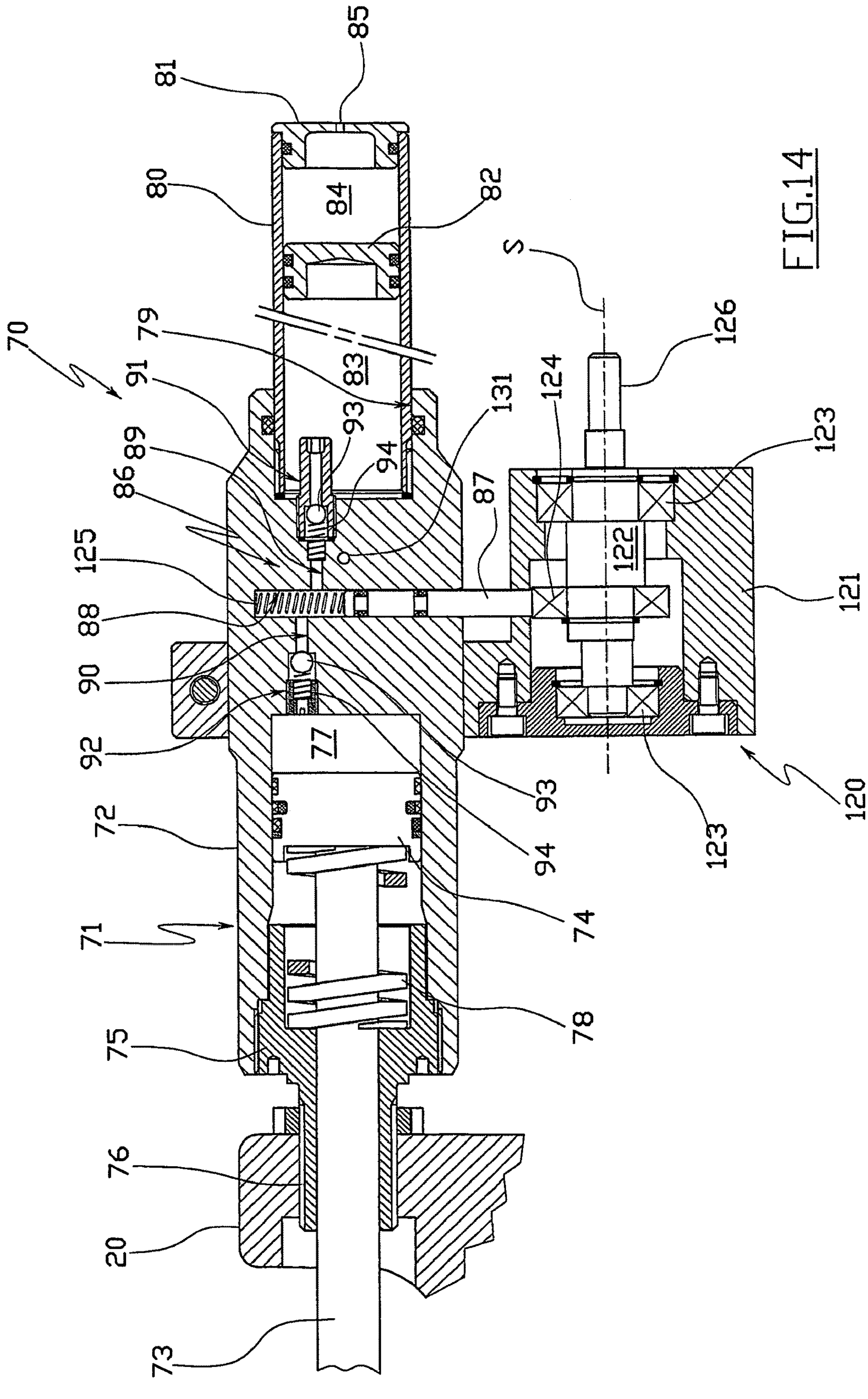
FIG. 14 is the trace section XIV-XIV indicated in FIG. 15.
Figure 15:
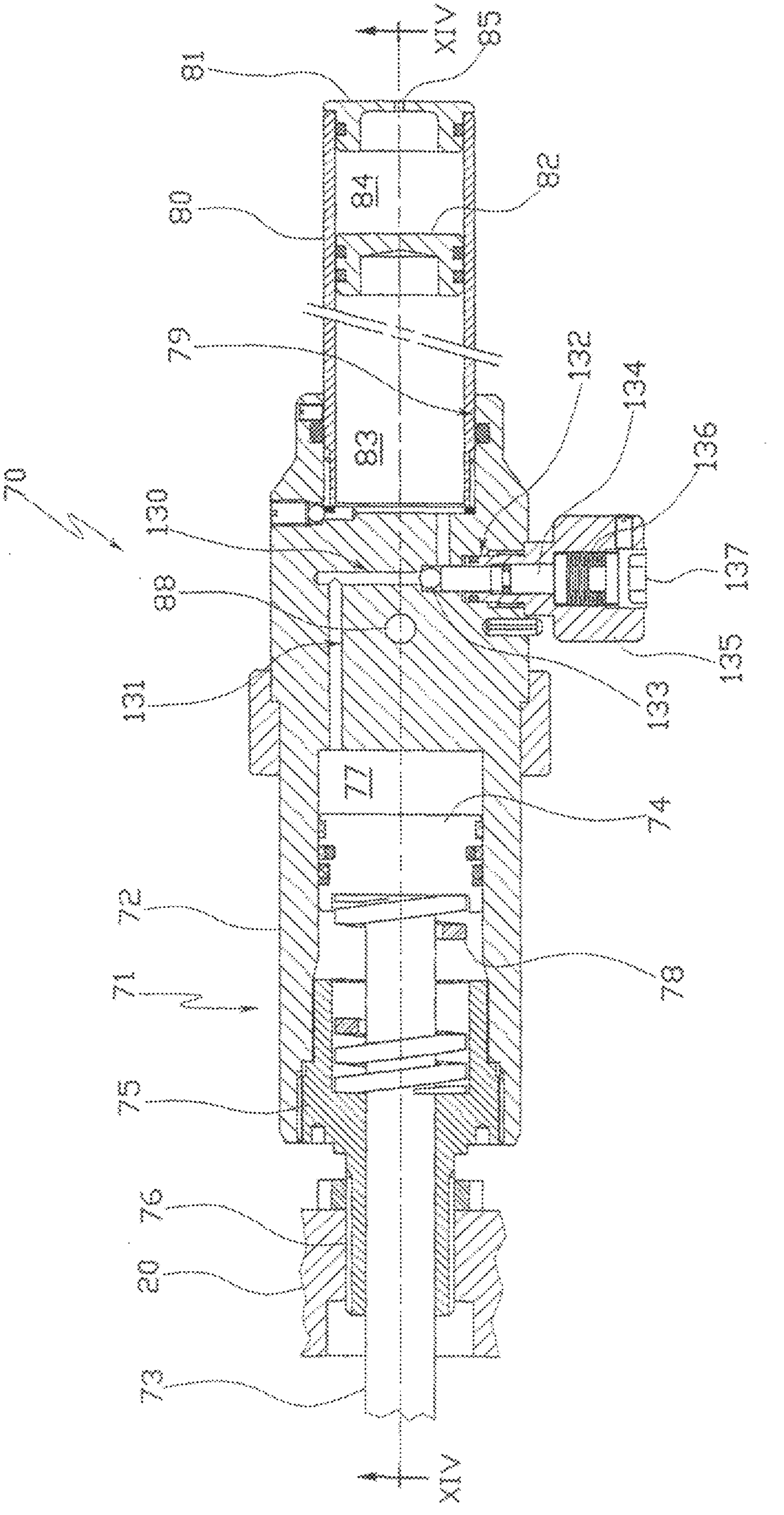
FIG. 15 is the trace section XV-XV indicated in FIG. 13 and shown in enlarged scale.
Figure 16:
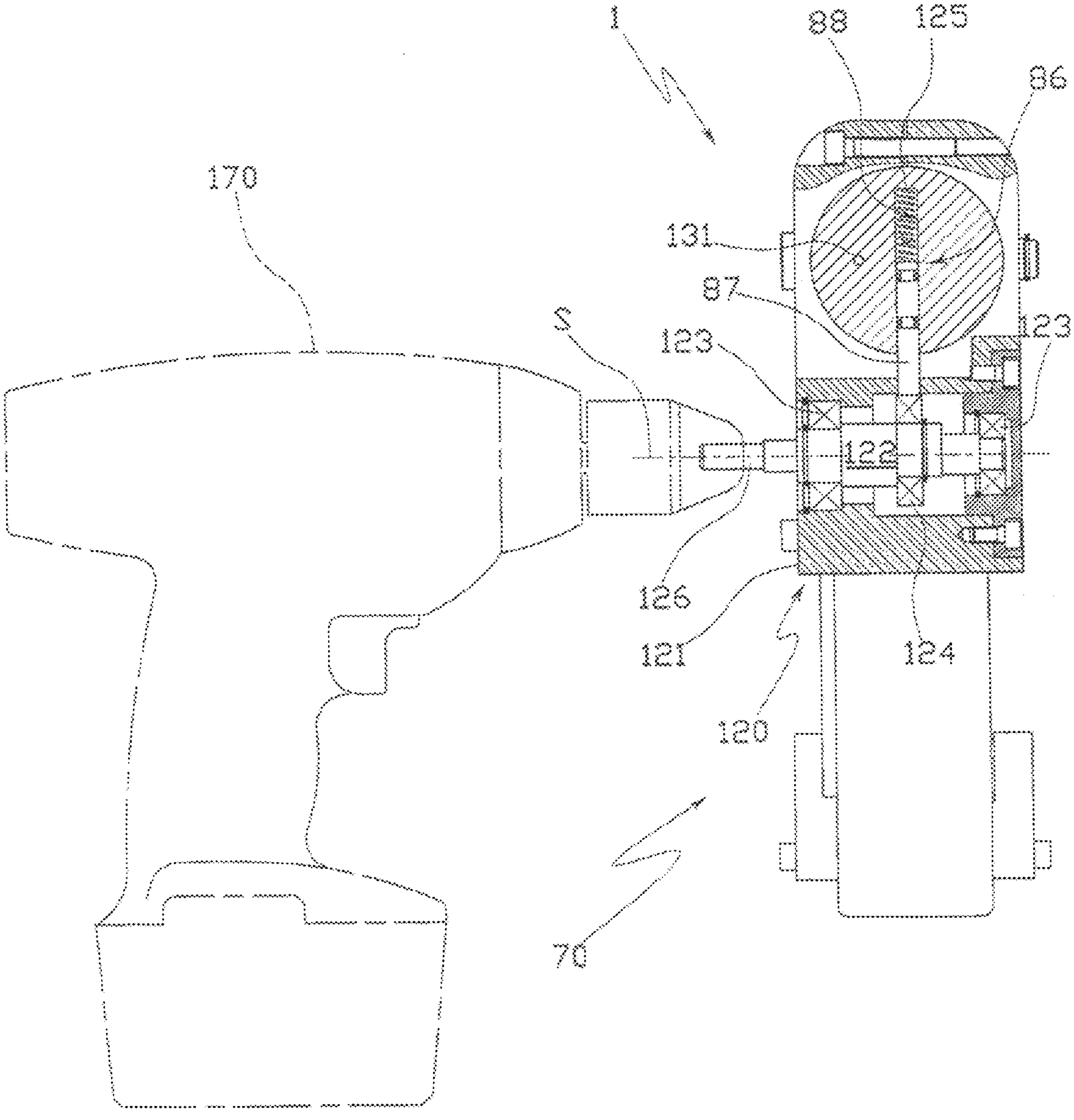
FIG. 16 shows an alternative embodiment of the actuation device of FIG. 13.

As is illustrated in the FIGS. 14 and 15, the plunger 73 is slidably received within a cylindrical cavity of the outer body 72, to which it is coupled by means of a plate 74.

In particular, said cylindrical cavity is closed on the outer side by a ring nut 75 with a central hole to allow the plunger 73 to project outward; the ring nut 75 is provided with a threaded shank 76 adapted to stably connect the outer body 72 of the hydraulic jack 71 with the outer body 20 of the tool 1.

The plate 74 defines at the inside of the cylindrical cavity a compression chamber 77, within which oil under pressure is pushed to cause the movement of the plunger 73, opposing the action of a spring 78 compressed between the plate 74 and the ring nut 75.

Further back with respect to the plunger 73, the outer body 72 is provided with a reception seat 79 adapted to be coupled, by means of the interposition of seal means, with a tubular cylindrical body 80 whose outer lateral surface makes a handgrip available for the clinching tool 1 (see FIG. 13).

Said cylindrical body 80 is closed on the outer side by a bottom cap 81, and receives a slidable slider 82 which subdivides its inner volume into two distinct chambers, including a tank chamber 83 for the containment of the oil intended for the actuation of the hydraulic jack 71, and a vent chamber 84 placed in communication with the outside by a central hole 85 in the bottom cap 81.

A volumetric pump, indicated in its entirety with 86, is firmly associated with the hydraulic jack 71; the pump 86 is adapted to suck the oil contained in the tank chamber 83 and drive it under pressure in the compression chamber 77, so to move the plunger 73 in the direction wherein it engages the punches 6 to press against the connection sleeve C.

Said volumetric pump 86 comprises a piston-cylinder group which is realised by a tight cylindrical cavity made in the outer body 72 of the jack 71, within which a plunger 87 is slidable received which defines, inside said cavity, a work chamber 88 communicating with the tank chamber 83 by means of a suction duct 89, and with the compression chamber 77 by means of a delivery duct 90.

Both suction ducts 89 and delivery ducts 90 are equipped with a respective automatic valve 91 and 92, which is composed of a spherical shutter 93 movable between a closed position and an open position of the related duct, and a spring 94 adapted to push said spherical shutter 93 towards the closed position.

In particular, the spring 94 of the valve 91 opposes the pressure dominating in the tank chamber 83, while the spring 94 of the valve 92 opposes the pressure dominating in the work chamber 88.

In accordance with the invention, the actuation device 70 comprises a kinematic group, indicated in its entirety with 120, adapted to engage the plunger 87 to move with alternating motion to drive the volumetric pump 86.

Said kinematic group 120 is firmly associated with the hydraulic jack 71, contained inside a support box 121 fixed to the outer body 72 by means of a clamp device, and is mechanically connectable to a separate motorisation device 170 adapted to place it in operation (see FIG. 13).

In detail, the kinematic group 120 comprises a transmission shaft 122 rotatably coupled to the support box 121 by means of a pair of bearings 123, so to be adapted to rotate around its own central axis S, and a cam 124 keyed to said transmission shaft.

The plunger 87 of the volumetric pump 86 projects from the outer body 72 of the jack 71 and is inserted inside a hole made in the support box 121, so that its end is in contact with the cam 124, which by rotating engages the plunger 87 to move with alternating motion.

In particular, the invention foresees constraining means adapted to keep the plunger 87 constantly in contact with the profile of the cam 124, such means being composed in the example of a return spring 125 placed inside the work chamber 88, and adapted to push the plunger 87 against the cam 124.

The cam 124 is preferably made from discoid body keyed on an eccentric intermediate section of the transmission shaft 122, and in the illustrated embodiment, is composed of a radial bearing, so to effectively reduce the contact friction with the plunger 87.

According to the invention, the transmission shaft 122 has an overhanging section 126, projecting from the support box 121, which is adapted to act as a connection shank for the mentioned separate motorisation device 170.

Said motorisation device 170 can be any one tool equipped with a rotating mandrel adapted to be coupled, in a removable manner, to said connection shank 126; preferable a normal drill.

In use, at every complete rotation of the transmission shaft 122, the cam 124 engages the plunger 87 to slide back and forth, sucking a certain amount of oil from the tank chamber 83 and pushing it inside the compression chamber 77, where the gradual increase of the pressure moves the plunger 73 of the hydraulic jack 71 in the direction wherein it engages the punches 6 to press against the connection sleeve C.

In particular, to limit to a safe value the pressure inside the compression chamber 77, the latter is connected to the tank chamber 83 also by a discharge circuit 130 (see FIG. 15), which comprises a return duct 131 made in the outer body 72 of the hydraulic jack 71, and a maximum pressure valve 132 which intercepts said return duct 131.

In particular, the maximum pressure valve 132 comprises a spherical shutter 133 movable between an open position and a closed position of the return duct 131, which is pushed in the closed position by a thrust stem 134.

Said thrust stem 134 is slidably received inside a valve body 135 screwed into the outer body 72 of the jack 71, and is in turn pressed against the spherical shutter 133 by a spring 136 compressed by a threaded calibration screw 137.

When the deformation step of the connection sleeve C is completed and the volumetric pump 86 is stopped, the pressure in the compression chamber 77 prevents the plunger 73 from spontaneously withdrawing to free the connection boss from the vice of the punches 6.

To discharge the compression chamber 77, it is therefore necessary to loosen the valve body 135 from the maximum pressure valve 132, so that the spherical shutter 133 does not oppose the oil flow, which once again flows inside of the tank chamber 83, pushed by the plate 74 by means of the spring 78.

In conclusion, it should be observed that the transmission shaft 122 of the kinematic group 120 can be oriented with respect to the hydraulic jack 71 in any manner deemed appropriate. For example, in FIG. 11 it is parallel to the longitudinal extension of the jack 71, while in the alternative embodiment of FIG. 16 it is transverse to it.

Of course, numerous modifications of applicative-practical nature can be made to the finding which is object of the invention, without departing from the scope of the inventive idea as claimed below.

The invention claimed is:

1. A tool for the connection of tubes (T) by means of connection sleeves (C), the tool comprising a jaw structure comprising two consecutive coplanar curved jaws connected at one end by a hinged joint allowing the jaws to rotate on a rotation axis orthogonal to their common position plane between an open rest position, wherein they define a laterally open reception seat, and a closed work position wherein they define an annular closed reception seat for a connection sleeve (C), each jaw of the jaw structure comprising an outer driving half ring fixed to the respective jaw and an inner support half-ring slidable with respect to the outer half ring on their common curvature axis, the inner and outer half rings forming an inner and an outer ring while the tool is in the work position, each inner half ring being provided with at least one radial engagement recess for housing a respective punch, and each outer half ring comprising a radially shaped profile cooperating with said punch to make the punch slide in its recess when said inner support half-rings rotates along its own curvature axis with respect to the outer driving half-ring, and a device to rotate one of the inner support half rings with respect to its outer driving half-ring, wherein for every punch, the inner surface of said driving half-ring bears a shaped profile acting as a cam, and a cam follower interposed between said shaped profile and the related punch.

2. The tool according to claim 1, wherein the device to rotate one of the inner support half rings with respect to its outer driving half-ring comprises at least one advancing bracket fixed to the inner support half ring, and variable length device connecting said bracket and the jaw.

3. The tool according to claim 1 wherein at opposite ends with respect to said hinged joint, said jaws comprise a lock for locking the jaws in said closed work position.

4. The tool according to claim 1, wherein a closure plate is removably fixed to said support half-ring, for closing on a side of said at least one engagement recess for the punch.

5. The tool according to claim 1, wherein each said cam follower comprises a rolling element received in a rolling race made in the inner surface of the driving half-ring, and a thrust section received in a housing seat made in the support half-ring, which is interposed between said rolling element and the punch.

6. The tool according to claim 5, wherein each said cam follower comprises a thrust section received in a housing seat made in the support half-ring which has a rounded end adapted to stay in contact with the inner surface of the driving half-ring.

7. The tool according to claim 1, wherein for every punch a control device is provided to keep the punch very close to its respective cam follower.

8. The tool according to claim 7, wherein said control device comprises a first permanent magnet integral with the punch and a second permanent magnet integral with the support half-ring, which are positioned so as to constantly exert a mutual attraction force which pushes the punch against the respective cam follower, and in turn the cam follower against the shaped profile.

9. The tool according to claim 1, further comprising at least eight punches.

* * * * *